United States Patent
Pankajakshan et al.

(10) Patent No.: US 9,414,305 B2
(45) Date of Patent: Aug. 9, 2016

(54) INTELLIGENT NETWORK SELECTION SYSTEM

(71) Applicant: METROPCS WIRELESS, INC., Richardson, TX (US)

(72) Inventors: Bejoy Pankajakshan, Plano, TX (US); Ronald Unger, Dallas, TX (US); Mesut Guven, Allen, TX (US); Edward Chao, Plano, TX (US); Erik Kosar, Richardson, TX (US)

(73) Assignee: METROPCS WIRELESS, INC., Richardson, TX (US)

( * ) Notice: Subject to any disclaimer, the term of this patent is extended or adjusted under 35 U.S.C. 154(b) by 0 days.

(21) Appl. No.: 13/758,557

(22) Filed: Feb. 4, 2013

(65) Prior Publication Data
US 2014/0220967 A1 Aug. 7, 2014

(51) Int. Cl.
*H04W 48/18* (2009.01)

(52) U.S. Cl.
CPC ..................... *H04W 48/18* (2013.01)

(58) Field of Classification Search
CPC .............. H04W 48/18; H04W 48/00–48/20; H04W 74/0866–74/0891
USPC ................. 455/432.1, 435.1–435.3
See application file for complete search history.

(56) References Cited

U.S. PATENT DOCUMENTS

| | | | | |
|---|---|---|---|---|
| 6,564,055 B1 * | 5/2003 | Hronek | ................. | H04W 48/18 455/418 |
| 7,292,592 B2 * | 11/2007 | Rune | ....................... | H04L 45/34 370/328 |
| 7,356,337 B2 * | 4/2008 | Florence | ......... | H04M 1/274516 455/419 |
| 7,627,338 B2 * | 12/2009 | Hicks, III | .......... | H04M 3/42246 455/432.1 |
| 7,937,083 B2 * | 5/2011 | Oommen | ................ | H04L 12/66 455/432.1 |
| 8,073,441 B1 * | 12/2011 | Unger | ................... | H04W 48/18 455/404.2 |
| 8,090,395 B2 * | 1/2012 | Ngai | ................... | H04W 36/385 455/432.1 |
| 8,290,485 B1 | 10/2012 | Singh et al. | | |
| 8,351,939 B1 * | 1/2013 | Singh | .................... | H04W 48/16 370/278 |
| 2003/0040311 A1 * | 2/2003 | Choi | ..................... | H04W 48/20 455/434 |

(Continued)

FOREIGN PATENT DOCUMENTS

DE    102004035956 A1    7/2006
WO        0147315 A1    6/2001

OTHER PUBLICATIONS

PCT: International Preliminary Report on Patentability for PCT/US2014/014407 (related application); Aug. 13, 2015; 5 pgs.

(Continued)

*Primary Examiner* — Mehmood B Khan
(74) *Attorney, Agent, or Firm* — Howison & Arnott, LLP

(57) ABSTRACT

A roaming partner selection system associated with a mobile device includes a preferred roaming list providing a plurality roaming partner networks that may provide a network connection to the mobile device when a home network may not be selected. At least one rule set controls the selection of one of a roaming partner network from the preferred provider list or a home network for establishing a connection with mobile device. Control logic controls a selection of at least one of the roaming partner network from the home network responsive to the at least one rule set and at least one predetermined input parameter. The at least one rule set establishes which of the at least one of the plurality of roaming partner networks or the home network should be selected by the control logic responsive to the at least one predetermined parameter.

21 Claims, 5 Drawing Sheets

(56) References Cited

U.S. PATENT DOCUMENTS

| | | | |
|---|---|---|---|
| 2003/0083064 A1* | 5/2003 | Cooper | 455/432 |
| 2003/0179708 A1* | 9/2003 | Kamerman | H04W 48/12 370/241 |
| 2004/0203745 A1* | 10/2004 | Cooper | H04W 48/18 455/432.1 |
| 2005/0090248 A1* | 4/2005 | Shen | H04W 12/06 455/432.1 |
| 2005/0091357 A1* | 4/2005 | Krantz | H04L 12/5692 709/223 |
| 2005/0113113 A1* | 5/2005 | Reed | H04L 12/5895 455/456.3 |
| 2006/0068786 A1* | 3/2006 | Florence | H04M 1/2745 16 455/435.2 |
| 2006/0068800 A1* | 3/2006 | Ruelke | H04W 36/20 455/450 |
| 2006/0077926 A1* | 4/2006 | Rune | H04L 45/34 370/328 |
| 2006/0286977 A1* | 12/2006 | Khandelwal | H04L 63/0442 455/432.1 |
| 2007/0191005 A1* | 8/2007 | Cooper | H04W 48/16 455/434 |
| 2007/0254646 A1* | 11/2007 | Sokondar | H04W 8/183 455/432.1 |
| 2007/0293263 A1* | 12/2007 | Eslambolchi | H04W 88/10 455/552.1 |
| 2008/0261603 A1* | 10/2008 | Sever | H04M 1/2745 66 455/445 |
| 2009/0052382 A1* | 2/2009 | Stephenson | H04W 16/14 370/329 |
| 2009/0156209 A1* | 6/2009 | Franklin | H04L 12/5692 455/435.2 |
| 2010/0041364 A1* | 2/2010 | Lott | G06Q 30/016 455/404.1 |
| 2010/0329218 A1* | 12/2010 | Hoshino | H04W 48/18 370/335 |
| 2010/0330986 A1* | 12/2010 | Rahman | H04W 48/18 455/432.1 |
| 2011/0046814 A1* | 2/2011 | Buffmire | H04W 48/18 701/2 |
| 2011/0110300 A1* | 5/2011 | Sachs | H04W 48/18 370/328 |
| 2011/0188376 A1* | 8/2011 | Stupar | H04L 12/5692 370/235 |
| 2011/0207503 A1* | 8/2011 | Ruperto | 455/552.1 |
| 2011/0256871 A1* | 10/2011 | Cooper | H04L 1/1877 455/436 |
| 2012/0077488 A1* | 3/2012 | Unger | H04W 48/18 455/432.1 |
| 2012/0115478 A1* | 5/2012 | Gunaratnam | H04W 48/18 455/435.2 |
| 2012/0184267 A1* | 7/2012 | Dwyer | H04W 36/0066 455/426.1 |
| 2012/0224549 A1* | 9/2012 | Myers | H03J 7/02 370/329 |
| 2012/0258710 A1* | 10/2012 | Swaminathan | H04W 48/16 455/433 |
| 2012/0264412 A1* | 10/2012 | Tervonen | H04W 48/08 455/418 |
| 2012/0282924 A1* | 11/2012 | Tagg | H04W 8/04 455/432.1 |
| 2012/0309370 A1* | 12/2012 | Yach | H04M 3/42246 455/414.1 |
| 2012/0309447 A1* | 12/2012 | Mustajarvi | H04W 48/18 455/524 |
| 2013/0034019 A1* | 2/2013 | Mustajarvi | H04W 48/16 370/254 |
| 2013/0102356 A1* | 4/2013 | Shaw | H04W 48/20 455/525 |
| 2014/0099945 A1* | 4/2014 | Singh | H04W 48/18 455/432.1 |
| 2014/0167724 A1 | 6/2014 | Deng et al. | |

OTHER PUBLICATIONS

Patent Cooperation Treaty: International Search Report and Written Opinion of related PCT/US2014/014407 application; V. Zhakovich; May 7, 2014; 5 pages.

* cited by examiner

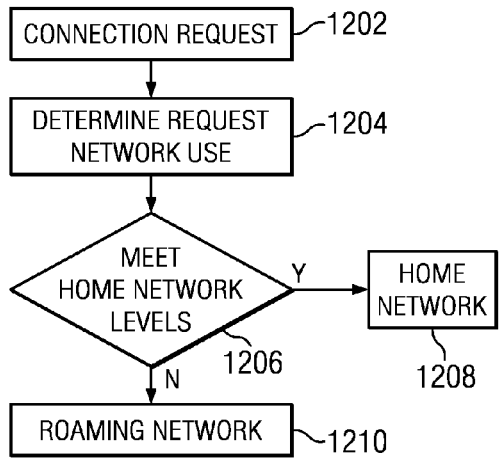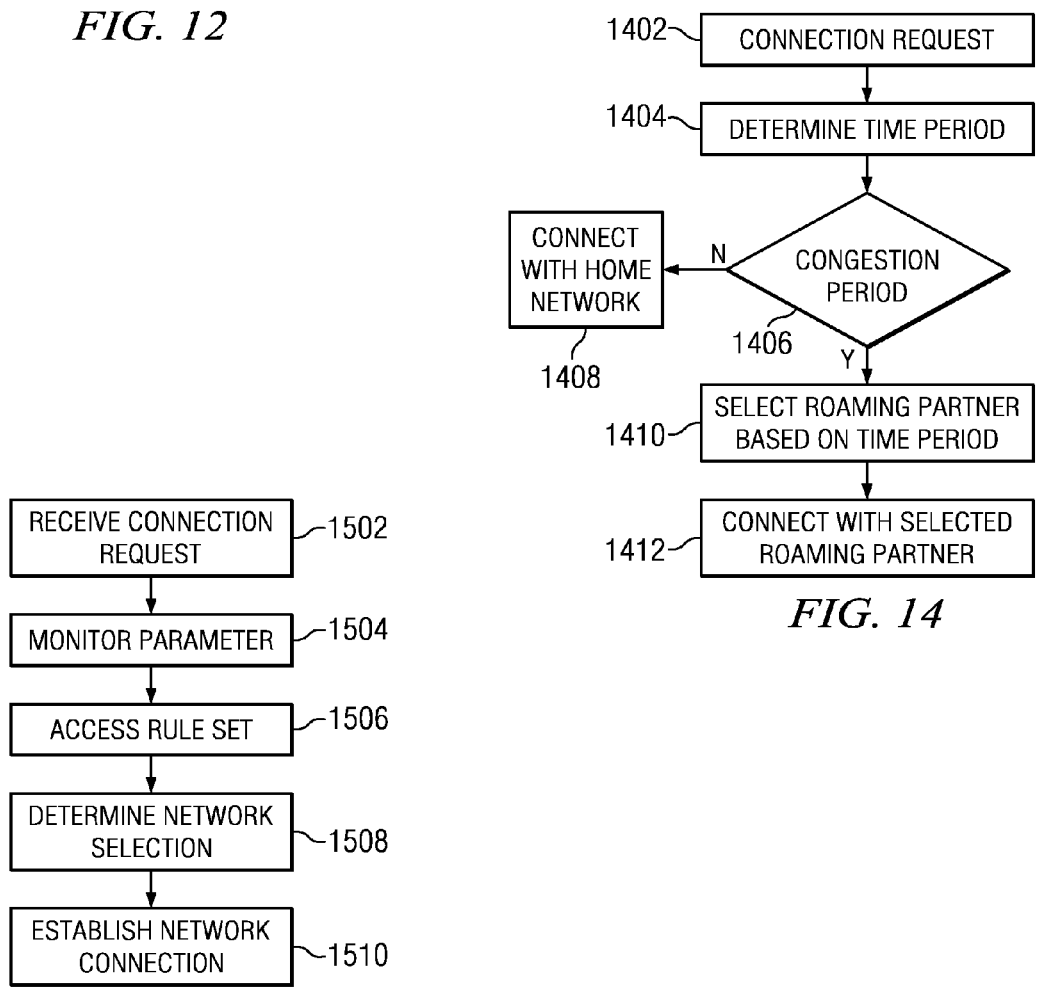

INTELLIGENT NETWORK SELECTION SYSTEM

TECHNICAL FIELD

The present invention relates to the selection of roaming partners for connection to one or more mobile devices, and more particularly, to an intelligent selection process of roaming partners or home networks based upon a rule set defining selection of members of a preferred roaming list based upon various factors.

BACKGROUND

A mobile device such as a mobile telephone, pager, PDA, or any wireless device has one or more home networks with which the mobile device will normally connect. Within a home network, the mobile device is able to obtain services based upon a monthly fee structure with or without a use-based fee structure. When leaving their home network or when unable to contact their home network, the user loses the ability to establish connections using their mobile device. In order to overcome this problem, network providers have entered into various roaming agreements. Roaming agreements enable users from one network to visit other networks and still obtain connectivity for their mobile device even when they are unable to contact their home network or are located outside of their home network (i.e., roaming).

In order to provide connectivity over large areas of the country, outside of a user's home network, home network providers often have a number of roaming agreements with a variety of different networks over the entire country. This requires the implementation of a preferred roaming list (PRL) within a given system, or similar type of priority list within other types of wireless systems, within the mobile device that provides the mobile device with a priority order for connecting to various roaming partners of the home network provider.

When attempting to register with a network to provide connectivity to the mobile device, the mobile device initially determines the signal strength of all the networks within the range of the mobile device. If the home network is providing sufficient signal strength, the mobile device will connect with the home network and provide calls and connectivity through the home network. However, in a situation where the home network is unable to provide sufficient signal strength to the mobile device, the mobile device determines the roaming partner of the home network to which the mobile device should connect.

To do this, the mobile device will examine the preferred roaming list and select the roaming partner having the highest priority on the referred roaming list that has a sufficient signal strength for connecting with the mobile device.

Currently, CDMA handsets use the preferred roaming partner definitions within the PRL in order to select the roaming partner when the home network is unavailable. LTE devices roaming without enhancement base roaming selection on static definitions on the USIM (Universal Subscriber Identity Module). A problem that may occur with the use of the PRL-type list arises from camping on a roaming partner's network when there is poor or no coverage from the home network. Current selection of roaming partners from a PRL are non-intelligent and always select a same roaming partner regardless of time and location or any other criteria. In certain locations and at certain times, a home network provider's capacity may be limited by available spectrum or network congestion, and the home network provider would like the ability to control the use of roaming partner network selections in order to alleviate this problem.

SUMMARY

The present invention, as disclosed and described herein, in one aspect thereof, comprises a roaming partner selection system associated with a mobile device includes a preferred roaming list providing a plurality roaming partner networks that may provide a network connection to the mobile device when a home network may not be selected. At least one rule set associated with the mobile device controls the selection of one of a roaming partner network from the preferred provider list or a home network for establishing a connection with mobile device. Control logic controls a selection of at least one of the roaming partner network from the preferred provider list or the home network responsive to the at least one rule set and at least one predetermined input parameter. The at least one rule set establishes which of the at least one of the plurality of roaming partner networks from the preferred roaming list or the home network should be selected by the control logic responsive to the at least one predetermined parameter.

BRIEF DESCRIPTION OF THE DRAWINGS

For a more complete understanding, reference is now made to the following description taken in conjunction with the accompanying Drawings in which:

FIG. 12 is a flow diagram illustrating a first example of an implementation of the intelligent selection system;

FIG. 14 illustrates a flow diagram of a second implementation of an intelligent system selection application; and FIG. 15 is a flow diagram generally describing the manner for selecting a network for connection using the intelligent selection system.

DETAILED DESCRIPTION

Figure 1:
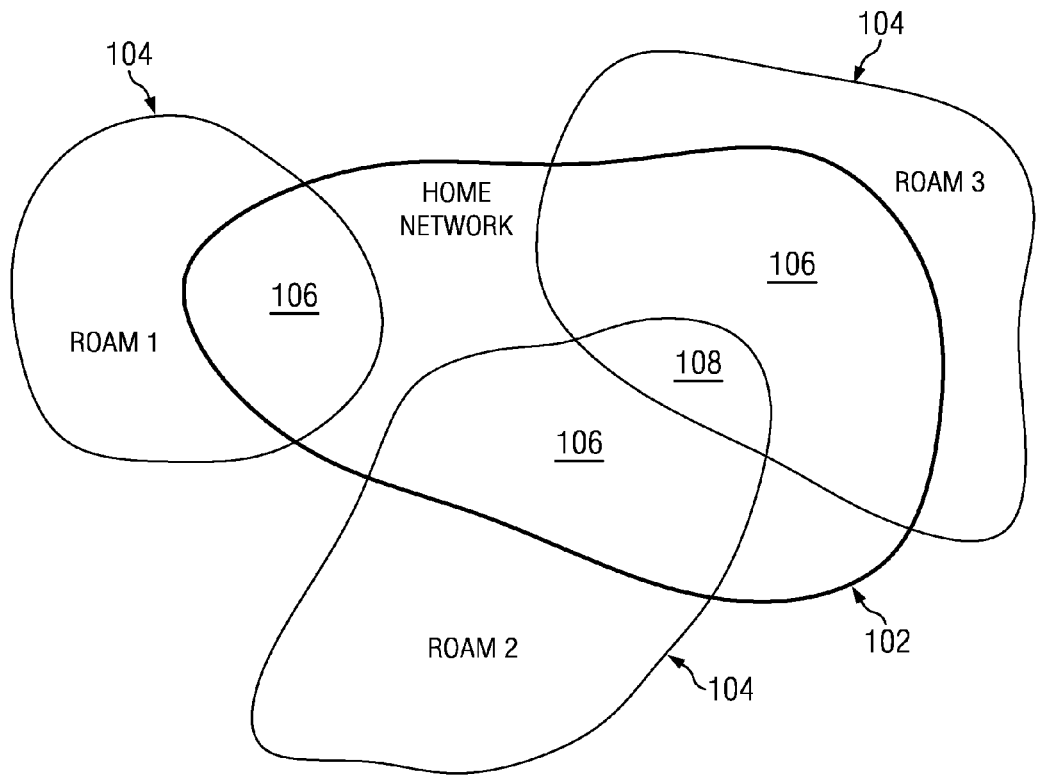
FIG. 1 illustrates the manner in which roaming partner networks may overlap a home network.

Referring now to the drawings, wherein like reference numbers are used herein to designate like elements throughout, the various views and embodiments of an intelligent roaming partner selection are illustrated and described, and other possible embodiments are described. The figures are not necessarily drawn to scale, and in some instances the drawings have been exaggerated and/or simplified in places for illustrative purposes only. One of ordinary skill in the art will appreciate the many possible applications and variations based on the following examples of possible embodiments.

Referring now to the drawings, and more particularly to FIG. 1, there is illustrated a home network 102 and a plurality of roaming networks 104. The home network 102 is the home operating area where a mobile device (mobile telephone, PDA, pager, or other wireless device) may access network services according to its standard charges. When exiting its home network 102, the mobile device may be provided services within one of the roaming networks 104. As can be seen within the illustration of FIG. 1, the home network has three different roaming networks 104 associated therewith. These roaming networks comprise roam 1, roam 2 and roam 3. Each of the roaming networks 104 includes a first portion that lies outside the home network 102 and a second portion that overlaps a portion of the home network 102. In some implementations, the roaming network 104 could be completely within the home network 102 or completely encompass home network 102. When a mobile device is located within one of the areas 106 that encompasses both the home network 102 and a roaming network 104, the mobile device could receive service from each of the home network 102 or the roaming network 104. There is even a situation in the area 108 where a mobile device could receive services from either the home network 102 or one of the two roaming networks 104.

In normal circumstances, a mobile device located within its home network 102 will receive services only from the home network 102. However, unique operating conditions within the home network may cause the signal strength to drop below a preselected level, causing the mobile device to connect with one of the overlapping roaming networks 104 rather than the home network 102. Thus, the mobile device is roaming in a situation when it is actually physically located within its home network 102 but has or should have the ability to connect with the home network 102. This creates undesirable roaming charges to a network provider or diminishes the services to the mobile device or to the user of the mobile device.

Figure 2:
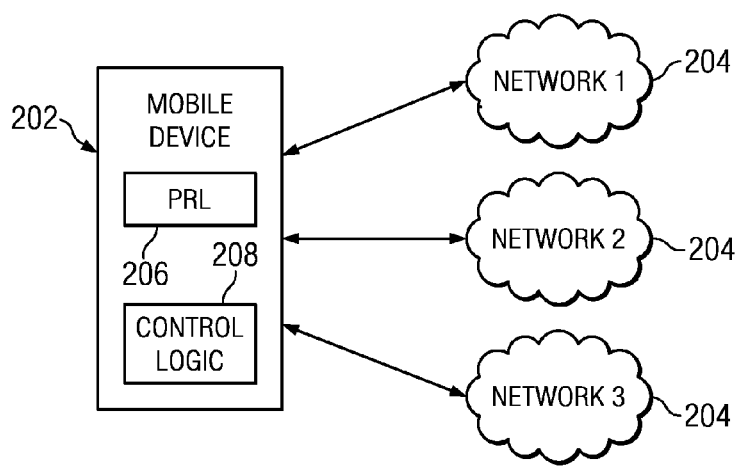
FIG. 2 illustrates a mobile device which may access a number of associated networks based upon a preferred roaming list.

Referring now to FIG. 2, there is illustrated a mobile device 202 which may wirelessly connect to a number of associated networks 204. The networks 204 may comprise a home network or a roaming network as described previously with respect to FIG. 1. The mobile device 202 determines how to interconnect with one of the networks 204 based upon a priority roaming list 206 and internal control logic 208. When a mobile device 202 is in a roaming mode of operation, the mobile device initially utilizes the control logic to scan for available roaming networks 204. Once the mobile device knows each of the available roaming networks 204, the mobile device 202 accesses a priority roaming list 206 to determine which of the networks 204 the mobile device should first attempt to access. The determination made by the control logic as to which network to access on the priority roaming list 206 can be based on the priority order of the networks that is established within the priority roaming list and the networks 204 having the required signal strength characteristics to provide connectivity with a mobile device 202. However, based upon other factors such as time of day, location or application that is requesting access, various other considerations rather than the priority established by the priority roaming list 206 may be appropriate to consider for selection of a roaming partner.

Figure 3:
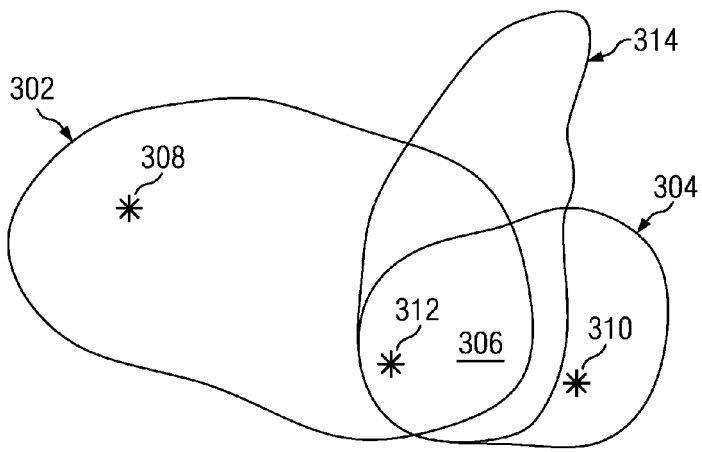
FIG. 3 illustrates the manner in which a mobile device may be located either within a home network, a roaming network or in an area served by both a home and roaming network.

Referring now to FIG. 3, there is illustrated an example wherein the home network 302 of a mobile device and the roaming networks 304, 314 of roaming network partners of the home network provider overlap in an area 306. When the mobile device is located in the area indicated generally at 308, the mobile device solely resides within a coverage area supported by the home network and service must be provided by the home network 302. Similarly, if the mobile device is located as indicated generally at 310, the mobile device will register with the roaming network as it resides within an area of coverage provided solely by the roaming network 304. Additionally, the roaming network 314 provides a coverage area that encompasses two roaming network 304 and the overlapping area 306 of the roaming network 304 and home network 302.

When the mobile device is in the location indicated generally at 312 of each of the overlapping home network 302 and roaming networks 304 and 314, the mobile device is provided overlapping coverage by each of the networks. Conceivably, the mobile device could acquire any of the home network 302 or the roaming networks 304 and 314. The service provider of the home network 302 may in differing situations prefer the mobile device to register with one of the home network 302, roaming network 304 or roaming network 314 depending upon the time of day, type of applications used or other types of parameters. This may be because of historic usage levels within the home networks at particular periods of time, bandwidth requirements or various other types of considerations. An intelligent selection system may be used for directing the mobile device to select particular ones of the roaming providers within a preferred roaming list depending upon these additional parameters. Thus, the mobile device would utilize information controlling the selection of the roaming provider from the preferred roaming list based upon any number of selected parameters that were relevant to the present circumstances of the mobile device.

Figure 4:
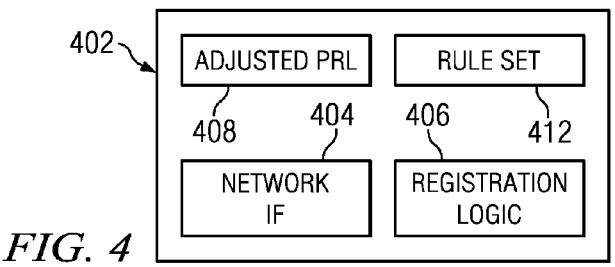
FIG. 4 is a functional block diagram of a mobile device for selecting a connecting network based upon an intelligent partner selection from a preferred roaming list.

Referring now to FIG. 4, there is provided a functional block diagram of a mobile device 402 including the functional elements necessary for registering with a network utilizing the intelligent selection system application described herein. Registration involves the mobile device 402 scanning for available networks, selecting a network for connection and transmitting the necessary registration information to register the mobile device 402 to operate within the selected network. The mobile device 402 includes a network interface 404 to enable the mobile device 402 to wirelessly connect to the home network and any number of various roaming networks. The network interface 404 provides the wireless connection hardware and software protocols for communicating with a particular wireless network such as a GSM network, CDMA network, 3G network, 4G network, etc.

Registration logic 406 provides the necessary protocols for registering a mobile device 402 with the network that is acquired. The registration logic 406 provides for the selection, provisioning and control of a network for connection to the mobile device 402. The registration logic 406 enables the mobile device 402 to register with a network by first scanning for available networks and then transmitting registration information to a network selected for connection. The mobile device registers with the home network by transmitting various identifiers and parameters from the mobile device 402 to the home network enabling the home network to confirm that the mobile device 402 is indeed a subscriber to the home network and allow access to the home network of the mobile device through the network interface 404 after the home network has been detected by an initial scan by the mobile device 402. Additionally, the registration logic 406 enables the mobile device 402 to contact various roaming networks. In the roaming case, similar identification information and registration parameters are transmitted from the mobile device 402 to the roaming network after the mobile device 402's initial scan determines that the home network is not available. The roaming network contacts the home network to determine first that the home network has some type of roaming agreement with the roaming network, and if so, confirms that the information provided from the mobile device 402 indicates that the mobile device is a valid subscriber to the home network. This enables the mobile device to roam with the roaming network and receive wireless communications connectivity.

The mobile device 402 selects the particular roaming network to be accessed by the mobile device based upon an adjusted PRL list 408 and a rule set 412 controlling which PRL of the adjusted PRL list 408 is selected. The rule set 412 can control which roaming network from the adjusted PRL 408 may be selected depending upon a number of parameters such as time of day, location of the device, type of application being utilized, etc. Based upon the parameters applicable to the rule set 412, the particular roaming subscriber within the adjusted PRL 408 is then selected. This differs from existing systems wherein the PRL list is fixed and the highest available priority roaming network that is available on the PRL is selected.

The rule set 412 is established for the mobile device 402 to control the manner in which the mobile device connects with the home network 302 and roaming networks 304 and 314. The rule set 412 comprises a profile defining the selection, provisioning and control of the mobile device with the available networks on the adjusted PRL 408. The rule set 412 utilizes the appropriate connection parameters in order to determine the selection within the adjusted PRL 408. The rule set 412 may be periodically updated within the mobile device 402 from the home network 302 utilizing push or pull technologies to keep the rule set 412 updated with the current state of the access rules for the home networks and the PRL.

An additional method for periodically updating the rule set 412 may utilize removable media such as a UIC card, SIM card, flash memory card, etc. In this way, rather than doing an over the air update to the mobile device 402, the rule sets are periodically updated by inserting a new or updated UIC card, SIM card, flash memory card, etc in the mobile device 402. Additionally, the over the air update of the mobile device 402 could be done via a Wi-Fi connectivity, Internet connection or some other type of non-cellular network rather than a cellular network.

The rule set 412 enables the intelligent system selection application to select a mobile operator for any number of purposes. This may include reducing the service provider's cost by selecting a lower cost roaming partner if multiple roaming service partners are available. The selection may additionally offload content to a partner network while ensuring a customer's quality of experience is as high when roaming given certain roaming partner networks and certain locations have a better quality of service than others at different times of the day. The application may switch traffic during peak hours or even during off-peak hours due to better roaming rates available from different roaming partners. The ISS solution is intelligent and selects a roaming partner considering several factors such as business relationship with the roaming partner, level of congestion on a cell site, application, etc.

Figure 5:
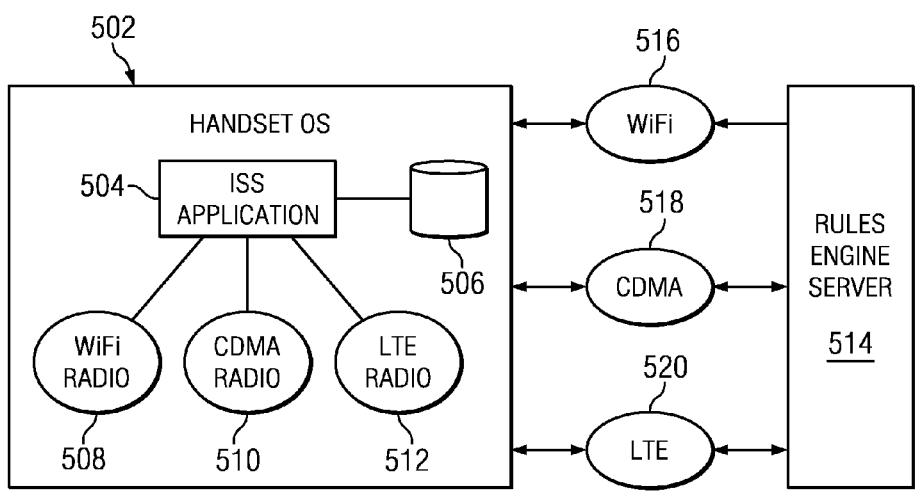
FIG. 5 illustrates implementation of the intelligent partner selection within a device application implementation.

Referring now to FIG. 5, there is illustrated one implementation of the intelligent system selection as a handset application. Within the handset the handset operating system 502 will have installed therein the intelligent system selection (ISS) application 504. The ISS application 504 can also be housed as an application on a SIM card within the mobile device that also have a CSIM and USIM. Thus, the ISS application 504 can easily interact with the USIM 4 and LTE system selection and with the CSIM for a CDMA system selection. The ISS application 504 will implement the various rules for the selection of a particular roaming network from the preferred roaming list based upon the locally stored rule set 506. The rule set 506 will establish the rules for the selection of a roaming or home network based upon desired selection parameters such as time of day, application used, etc. The ISS application 504 will make use of Wi-Fi radio functionalities 508, CDMA radio functionalities 510 and/or LTE radio functionalities 512 in order to establish a wireless connection for selection of a particular roaming network partner.

Remotely located rules engine server 514 may periodically update the information stored within the rule set 506 or update application of the rules via the ISS application 504. The rules engine server 514 may contact the mobile device and handset operating system 502 using any number of wireless communications networks such as a Wi-Fi network 516, a CDMA network 518 or an LTE network 520. Through these network connections, the ISS application 504 may communicate with the central rules engine server 514. The ISS application 504 utilizes information from the various possible network adaptors, 508, 510 and 512 for establishing the connections. The network selection policies are periodically downloaded to the rules database 506 from the rules engine server 514. Utilizing the information within the rules database 506, the ISS application 504 determines the best matching available network for a particular connection. If the selected roaming network is experiencing poor performance, the system may fall back to the standard PRL list priority order for the selection of the roaming network provider.

Figure 6:
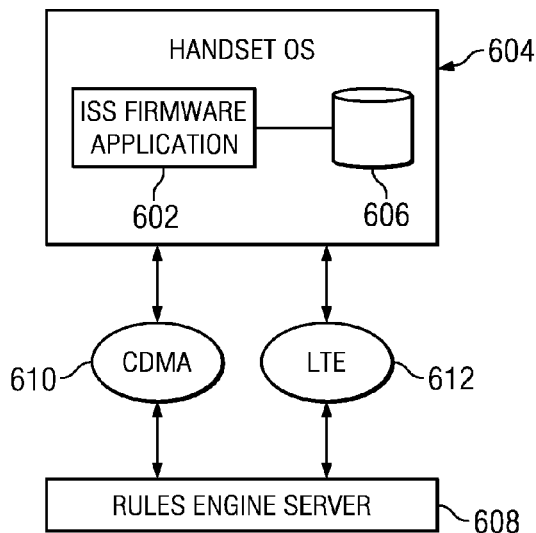
FIG. 6 illustrates an implementation of an intelligent partner selection architecture within a device firmware application.

Referring now to FIG. 6, there is illustrated a second implementation of the intelligent selection system wherein rather than the ISS being implemented as an application within the mobile device, the application is implemented within the firmware of the mobile device. In this case, an ISS firmware application 602 is implemented within a handsets operating system 604. As before, the ISS firmware application 602 is in communication with a locally stored rule set 606. The rule set 606 establishes the appropriate rules for selection of roaming or home networks from the preferred roaming list based upon rules established by a remotely stored rules engine server 608. The ISS firmware application 602 is implemented as a chip set firmware application and communicates with the rules engine server 608 over, for example, a CDMA communications network 610 or LTE communications network 612. This implementation would be limited to transport protocols supported by the device whose firmware implements the functionalities for retrieving the policy data and rule sets which are stored within the local database 606. This limits access to not include Wi-Fi networks since in most cases WiFi radio on a handset is provided by someone other than the chipset for LTE or CDMA. This implementation will enable routine download of limited size network selection policies to the local rule set database 606. The ISS firmware application 602 will utilize the local selection policy stored within the rule set database 606 to select a roaming network from the preferred roaming list.

Within each of the implementations of FIGS. 5 and 6, the rules engine server can be a standalone server with no interaction with the other network notes such as the PCRF, OTA server, etc. However, within some embodiments, the rules engine server can be integrated within the OTA server (over the air server) since both can use the OMA-DM protocol. Similarly, the policy control and resource function (PCRF) platform can be integrated with the rules engine. Currently, the PCRF is used for making policy decisions such as rate limiting traffic, online charging, etc. and is only integrated with the packet gateway (PGW for LTE/HA for CDMA, etc.). The ANDSF is not available today and the rules engine server functions can be integrated with the ANDSF.

Figure 7:
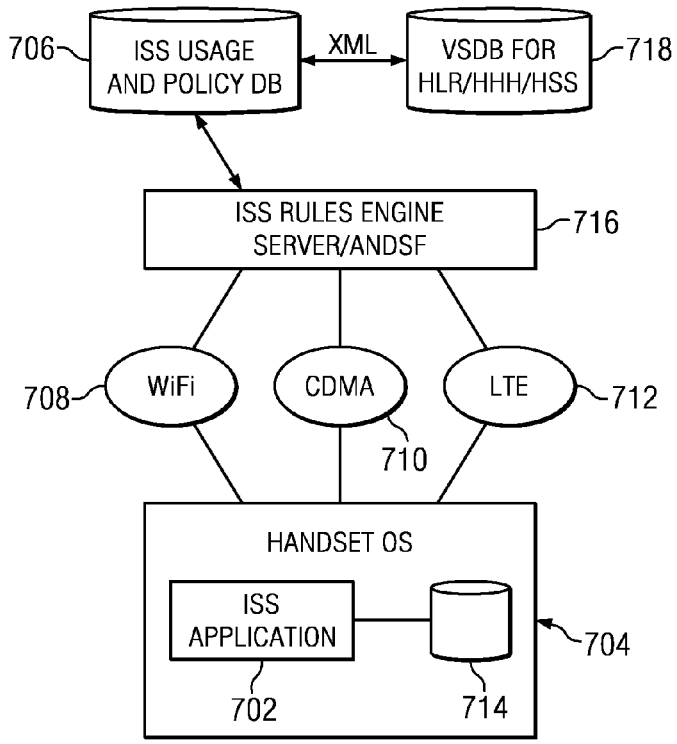
FIG. 7 illustrates an integrated network/client solution for the intelligent partner selection from a preferred roaming list.

Referring now to FIG. 7, rather than implementing the intelligent selection system as an application or within the firmware of the mobile device, an integrated/client solution can be utilized where in the ISS application 702 is implemented both within the handset operating system 704 and the ISS usage and policy database 706 is stored remotely and accessed by the mobile device through a Wi-Fi network 708, CDMA network 710 or LTE network 712. The ISS application 702 can have access to locally stored information at a local database 714. The ISS usage and policy database 706 provides the rules that are implemented through the ISS rules engine server/ANDSF 716. The ISS rules engine server 716 is a fully functional ANDSF which is an evolve OMA-DM/OTA server or even a PCRF (requiring external policy push to rules server if using a separate PCRF). The ISS usage and policy database 706 is merged with the user database 718 to execute advanced analytics for determining with which roaming network to establish a connection. The ISS rules engine server 716 will provide instructions to the client ISS application 702 instructing the mobile device which network to select. The ISS application 702 communicates with the center ISS rules engine server 716 through one of the Wi-Fi network 708, CDMA network 710 and LTE network 712. Thus, the implementation of FIG. 7 utilizes a network/client solution that utilizes information to provide selection decisions from these remotely located ISS rules engine server 716 rather than from an application stored on the handset or on the handset firmware.

Figure 8:
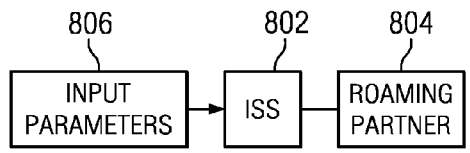
FIG. 8 illustrates a generalization upon which various selection parameters may be used by the intelligent system selection application in order to select a roaming partner from an associated PRL.
Figure 9:
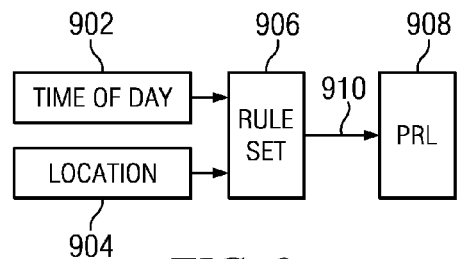
FIG. 9 illustrates a first manner for controlling the intelligent system selection based upon a time of day and location of a mobile device.
Figure 10:
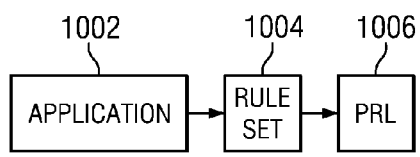
FIG. 10 illustrates an intelligent selection based upon a particular application being utilized by a mobile service user.

Referring now to FIG. 8, as mentioned previously, the intelligence selection system application 802 is used for selecting a particular roaming partner 804 based upon any number of input parameters 806. Thus, as illustrated in FIG. 8 one of any number of input parameters 806 provided to the intelligent selection system applications 802. The intelligence system selection application 802 utilizes the input parameter to determine which of a number of roaming partners should be selected based upon the provided input information. These decisions can change based upon any number of things such as time of day, location, application provided and the intelligent system selection applications 802 then outputs the roaming partner 804 that is appropriate based upon the provided input parameters 806. Referring now also to FIGS. 9 and 10, there are illustrated more particular applications of the intelligent system selection application 802.

FIG. 9 illustrates a process wherein the input parameters comprise the time of day 902 and location 904 of a mobile device. Either of these parameters could additionally be used individually or in conjunction with additional parameters. The particular rule set 906 associated with the intelligent system selection application 802 analyzes the time of day 902 and location 904 of the mobile device and outputs a desired selection to the preferred roaming list 908. The indicated selection 910 provided to the preferred roaming list 908 is selected and used for establishing a connection between the mobile device and the selected roaming partner.

Also, as illustrated in FIG. 10, the selected input parameter can comprise the application 1002 that is making the request for connection to a wireless network. In this case the type of application 1002 is provided to the rule set 1004, and the rule set makes a selection of a roaming provider based upon the type of application that is making the request. The selected roaming provider is then provided to the PRL 1006 enabling the selection of a roaming provider that is most beneficial to the type of application that is being used.

Figure 11:
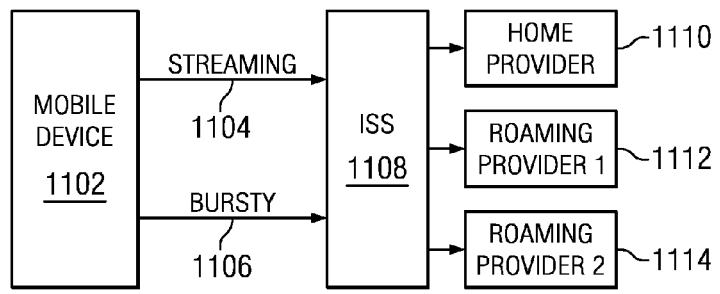
FIG. 11 is a block diagram illustrating the implementation of a first embodiment of an intelligent selection system.

Referring now to FIGS. 11 and 12, there is illustrated one example of a manner for implementing the intelligent selection system application in a situation wherein a use of streaming applications or bursty traffic application are relevant to a determination of the provider to be selected. A mobile device 1102 is located within an area having home network coverage and a strong signal, but the area is congested at certain times of the day. The mobile device 1102 desires to view online information with respect to fantasy sports teams by watching streaming video and surfing the web. At a selected location, a home network service provider 1110 includes two roaming partners. The subscriber device preferred roaming list has roaming partner one 1112 as the primary roaming partner and roaming partner two 1114 as the secondary preferred partner. At the same location, signals from both roaming partners are available and strong. The home network provider 1110 can handle bursty traffic reasonable well but would not be able to handle real time streaming applications without degrading the QoE (quality of experience) of the subscriber and impacting other users. Similarly, the home network service provider does not want to entertain the usage of certain high bandwidth applications in the congested location.

Using the ISS application 1108 the home network provider 1110 can allow a subscriber's download traffic applications (bursty traffic) to be routed through the home network 1110 but force the streaming videos or other high bandwidth consuming applications to be routed to one of the roaming providers 1112 or 1114. Thus, upon receipt of a connection request at Step 1202 a determination is made at Step 1204 as to the requested network use. In other words a determination is made if the user merely desires to surf the web and requests access to websites which would be bursty traffic 1106 or is requesting to view streaming videos 1104 requiring the use of a streaming application. Inquiry Step 1206 determines if the requested network use would enable the home network to meet the desired levels for quality of experience that the home network provider 1110 wishes to provide to their customers. If so, in the case of a bursty application 1106 versus a streaming application 1104, the home network provider 1110 is provided as the network service connection service provider at Step 1208. However, if inquiry Step 1206 determines that the requested type of connection would not provide the desired quality of experience to the subscriber or other customers, a roaming network provider is provided as the connection provider at Step 1210. Thus, using the intelligent service selection application the home network provider 1110 can allow the subscribers to download bursty traffic to be routed through its own network while forcing streaming videos or other high bandwidth consuming applications to be routed through one of its roaming partners in order to limit degrading of the QoE for the user and adversely impact other home network customers.

Figure 13:
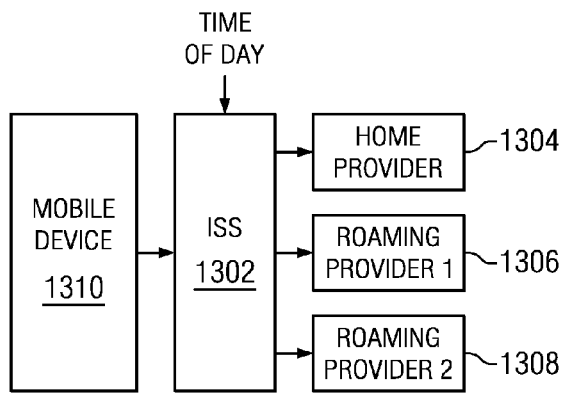
FIG. 13 is a block diagram illustrating the implementation of a second embodiment of an intelligent selection system.

Referring now to FIGS. 13 and 14, there is illustrated yet a further example in which the intelligent selection system application 1302 may be used for selecting a connection service provider based upon a particular time of day in which a request is made. A subscriber is walking around a selected service area at noon on a Monday. The subscriber enters a café wherein the home network provider 1304 has coverage and a strong signal but is congested at this time of day. Wi-Fi is not an option at this location. At the selected location, the home network provider 1304 has two roaming providers, roaming provider one 1306 and roaming provider two 1308. The subscriber mobile device 1310 has a PRL listing roaming provider one 1306 as the primary partner and roaming partner number two as the secondary preferred provider. At the selected location, signals from both roaming providers 1306 and 1308 are available and strong. The home network provider 1304 has typically experienced network congestion upon their network serving this area from 11:30 a.m. to 3:30 p.m. Roaming provider one 1306 charges the home network provider 1304 X dollars per gigabyte more than roaming provider two 1308 to handle roaming traffic sent through the network between 11:00 a.m. and 2:00 p.m. Roaming provider one 1306 also charges the home network provider Y dollars per gigabyte less than roaming provider two from 2:00 p.m. to 6:00 p.m. Currently, the subscriber can only connect to roaming provider one as the preferred roaming partner as determined by their PRL within their mobile device 1310. Using the intelligent service selection system, the home network provider can offload the subscriber to the network of roaming provider number two 1308 so that the subscriber can access the Internet at the lowest possible cost for the home network provider 1304 rather than utilizing the primary roaming partner network as indicated by the PRL.

Assuming the subscriber returns to this location at 3:00 p.m., at this time, the home network provider can use the ISS application 1302 to off load the subscriber to the network of roaming provider number one 1306. This would enable the user to access the Internet again at the lowest possible cost to the home network provider 1304. At 4:00 p.m., the subscriber is still located within this area. Since it is after the time when the home network provider 1304 is congested, the user may now connect through their own home network avoiding any roaming or associated charges due to the use of roaming partners.

Referring now to FIG. 14 there is more fully illustrated a flow diagram for the process based upon a time of day and/or associated cost. A connection request is received at Step 1402 and a time period at which the connection request is made is determined at Step 1404. Inquiry Step 1406 determines if the time period is associated with a particular congested period of the home network. If no congestion period exists, the subscriber is connected with their home network at Step 1408. If inquiry Step 1406 determines that the request has been made during a congestion period, a roaming partner may be selected based upon the time period at Step 1410. In addition to basing the selection to the time period, as described here and above, time based selections could also be based upon charges of the roaming provider to the home network provider for taking roaming customers during particular time periods. Finally, the subscriber is connected to the selected roaming partner at Step 1412.

Referring now to FIG. 15, there is illustrated a flow diagram generally illustrating the process for using the intelligent system selection application to control the selection of a network for connection with a mobile device based upon a predetermined system parameter. Initially, a wireless network connection request is received at Step 1502 for a particular type of application within the mobile device. The particular parameter that is to be monitored for assisting in selection of the network is monitored or determined at Step 1504. As described previously, this parameter may comprise things like time of day, type of application, effect on quality of experience on the mobile device or other customer, etc. The rule set associated with the intelligent selection system is accessed at Step 1506 in order for the intelligent selection system to determine with which network the mobile device should connect. The determination of the appropriate network, be it either a roaming network from the preferred roaming list or the home network, is made by the intelligent selection system utilizing the information within the rule set and the monitored parameter at Step 1508. Once the network is determined, a connection is established at Step 1510 with the selected network to provide access to the mobile device.

Using the above described system and method, the selection of a roaming provider or a home network utilizing a mobile device and its associated preferred roaming list may be intelligently and dynamically controlled by the intelligent selection system application implemented either within the mobile device or at a network level. This will enable the selections of the home provider or roaming providers to be made in a manner that is most beneficial to the home network provider and provides maximal cost-effectiveness to the home provider and the subscriber. The application also enables selections to be most beneficial to a subscriber's quality of experience on the network.

It will be appreciated by those skilled in the art having the benefit of this disclosure that this intelligent roaming partner selection provides an intelligent network of selecting a roaming partner for providing service to a mobile device. It should be understood that the drawings and detailed description herein are to be regarded in an illustrative rather than a restrictive manner, and are not intended to be limiting to the particular forms and examples disclosed. On the contrary, included are any further modifications, changes, rearrangements, substitutions, alternatives, design choices, and embodiments apparent to those of ordinary skill in the art, without departing from the spirit and scope hereof, as defined by the following claims. Thus, it is intended that the following claims be interpreted to embrace all such further modifications, changes, rearrangements, substitutions, alternatives, design choices, and embodiments.

What is claimed is:

1. A roaming partner selection system associated with a mobile device, comprising:
   a database storing a preferred roaming list providing a plurality roaming partner networks that may provide a network connection to the mobile device;
   a second database storing at least one rule set associated with the mobile device for controlling a selection of a roaming partner network from the preferred roaming list for establishing a connection with mobile device;
   a controller for controlling the selection of the roaming partner network from the preferred roaming list responsive to the at least one rule set and a plurality of predetermined input parameters rather than a preferred roaming list order when the mobile device is located outside of a home network;
   wherein the at least one rule set establishes which of the plurality of roaming partner networks should be selected from the preferred roaming list by the controller responsive to the plurality of predetermined input parameters; and
   wherein the plurality of predetermined input parameters comprise a time of day, a type of application requiring access, and an effect on quality of experience of a subscriber of the mobile device, and further wherein the at least one rule set establishes that a first roaming partner network has priority of selection when the plurality of predetermined input parameters have a first set of values, and a second roaming partner network when the plurality of predetermined input parameters have a second set of values.

2. The roaming partner selection system of claim 1, further including a rules engine server for periodically updating the at least one rule set.

3. The roaming partner selection system of claim 1, wherein the controller is implemented as an application program within the mobile device.

4. The roaming partner selection system of claim 1, wherein the controller and the at least one rule set are implemented within the home network of the mobile device.

5. The roaming partner selection system of claim 1, wherein the controller is implemented within the firmware of the mobile device.

6. The roaming partner selection system of claim 1, wherein the at least one rule set further controls the selection of a roaming partner network from the preferred roaming list or the home network for establishing the connection with the mobile device responsive to the at least one predetermined parameter.

7. The roaming partner selection system of claim 6, wherein the controller further controls selection of the roaming partner network or the home network responsive to the at least one rule set and the at least one predetermined parameter.

8. A method for selecting a roaming network for providing wireless services to a mobile device, comprising:
    monitoring a plurality of predetermined parameters, wherein the plurality of predetermined parameters comprises a time of day, an application requiring access and a quality of experience of a mobile subscriber;
    accessing a rule set containing rules for selecting the roaming network for providing wireless services to the mobile device responsive to the plurality of predetermined parameters when the mobile device is located outside of a home network;
    determining which roaming network to select from a plurality of roaming networks based upon the rule set and the plurality of predetermined parameters when the mobile device is located outside of the home network; and
    establishing the wireless connection between the mobile device and the determined roaming network when the mobile device is located outside of the home network.

9. The method of claim 8, wherein the step of accessing further comprises accessing a rule set containing rules for selecting a roaming partner network from the plurality of networks for providing wireless services to the mobile device responsive to the plurality of predetermined parameters.

10. The method of claim 9, wherein the step of determining further comprises selecting the roaming partner network from the plurality of networks responsive to the rule set and the plurality of predetermined parameters.

11. The method of claim 8, wherein the step of accessing further comprises accessing a rule set containing rules for selecting one of a roaming partner network or the home network from the plurality of networks for providing wireless services to the mobile device responsive to the plurality of predetermined parameters.

12. The method of claim 11, wherein the step of determining further comprises selecting the roaming partner network or the home network from the plurality of networks responsive to the rule set and the plurality of predetermined parameters.

13. The method of claim 8 further including the step of periodically updating the rules of the rules set for selecting a network from the plurality of networks.

14. The method of claim 8, wherein the step of determining occurs within the mobile device.

15. The method of claim 8, wherein the step of determining occurs within the home network of the mobile device.

16. The method of claim 8, wherein the step of establishing further comprises:
    establishing a first network has priority of selection if the time of day is within a first predetermined time of day; and
    establishing a second network has priority of selection if the time of day is within a second predetermined time of day.

17. The method of claim 8, wherein the step of establishing further comprises:
    establishing a first network has priority of selection if the application is of a first type; and
    establishing a second network has priority of selection if the application is of a second type.

18. The method of claim 8, wherein the step of establishing further comprises:
    establishing a first network has priority of selection if the quality of experience is of a first level; and
    establishing a second network has priority of selection if the quality of experience is of a second level.

19. A roaming partner selection system associated with a mobile device, comprising:
    a database storing a preferred roaming list providing a plurality roaming partner networks that may provide a network connection to the mobile device when the mobile device cannot connect to a home network;
    a second database storing at least one rule set associated with the mobile device for controlling a selection of one of a roaming partner network from the preferred roaming list or a home network for establishing a connection with mobile device;
    a controller for controlling the selection of at least one of the roaming partner network from the preferred roaming list or the home network responsive to the at least one rule set and a plurality of predetermined input parameters rather than a preferred roaming list order when the mobile device is located outside of the home network;
    wherein the at least one rule set establishes which of the at least one of the plurality of roaming partner networks from the preferred roaming list or the home network should be selected by the controller responsive to the plurality of predetermined input parameters; and
    wherein the plurality of predetermined input parameters comprise the time of day, a type of application requiring access, and an effect on quality of experience of a subscriber of the mobile device, and further wherein the at least one rule set establishes that a first roaming partner network has priority of selection when the plurality of predetermined input parameters have a first set of values, and a second roaming partner network when the plurality of predetermined input parameters have a second set of values.

20. The roaming partner selection system of claim 19, further including a rules engine server for periodically updating the at least one rule set.

21. The roaming partner selection system of claim 19, wherein the controller and the at least one rule set are implemented within the home network of the mobile device.

* * * * *